Figure 1:
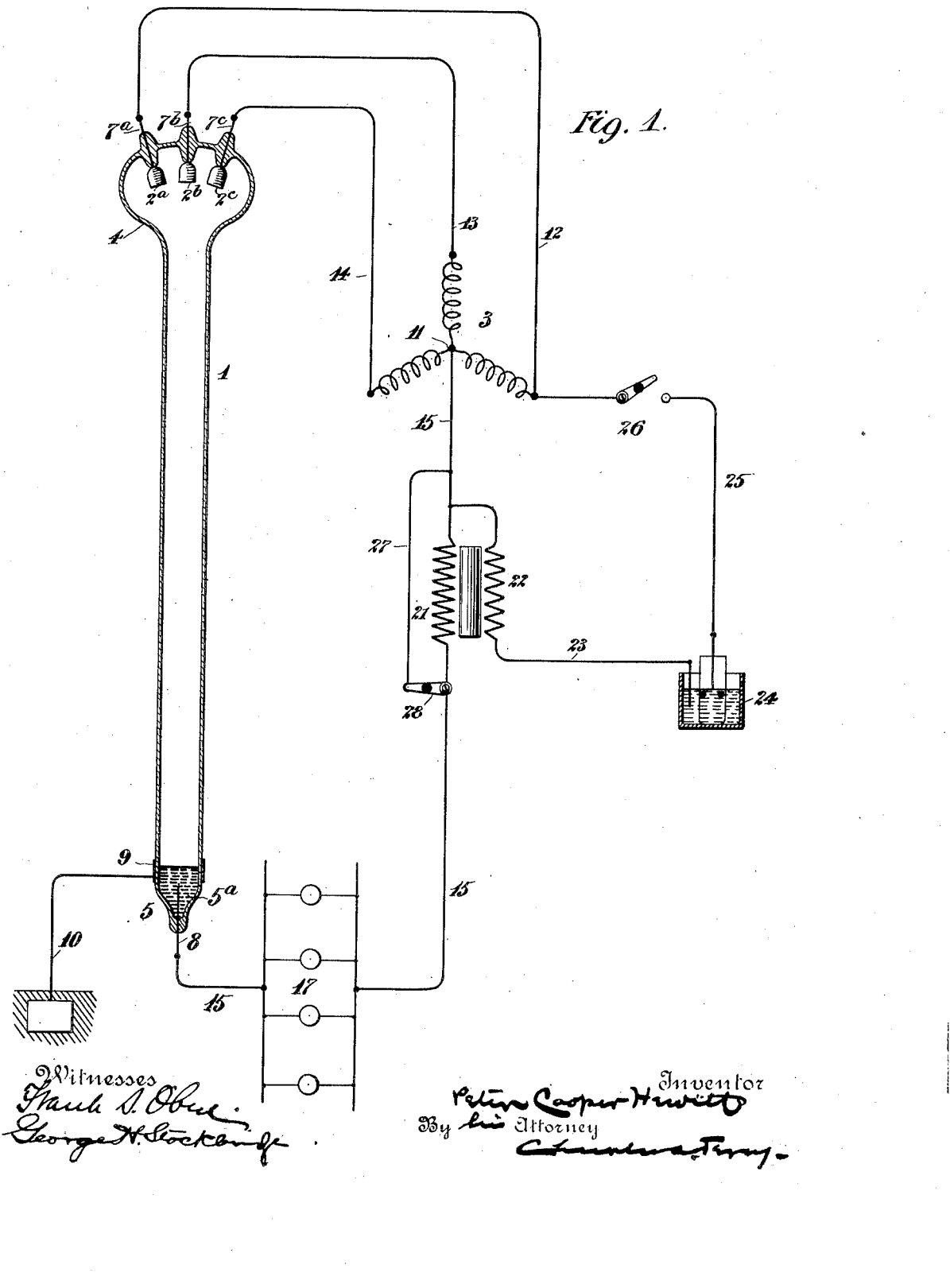

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

DIRECTIONAL-CURRENT ARRESTER.

1,097,547.  Specification of Letters Patent.  Patented May 19, 1914.

Application filed October 30, 1902. Serial No. 129,352.

*To all whom it may concern:*

Be it known that I, PETER COOPER HEWITT, a citizen of the United States, and a resident of New York, in the county of New York and State of New York, have invented a certain new and useful Directional-Current Arrester, of which the following is a specification.

In the apparatus devised by me and disclosed in certain patents granted to me on the 17th day of September 1901 the following characteristics are to be noted: The principal resistance opposed to the starting of current flow through the device exists at the negative electrode. Once this is broken down or overcome current will pass under the influence of comparatively low electromotive force. The starting resistance at the negative electrode may conveniently be called the negative electrode reluctance. Moreover, so long as this reluctance remains overcome, current may flow to the negative electrode from the original positive electrode or from another positive acting in coöperation with the negative electrode. In this way, among others, the device may be kept alive and may pass current through it to supply a receiving circuit beyond the negative electrode. Accordingly, if a device of this character be provided with several positive electrodes which are connected successively with sources of positive electromotive forces, current may be caused to flow successively through the device from the several positive electrodes, provided that at all times a sufficient electromotive force is developed to prevent the negative electrode reluctance from reëstablishing itself. In all cases the negative electrode reluctance has to be broken down, even though one of the positive electrodes were negative with reference to another. Thus a barrier to the flow of current in the reverse direction is provided by reason of the negative electrode reluctance which would reside at the positive electrode on becoming negative. It is clear that a system having these characteristics could be operated with polyphase alternating electric currents where each phase of the current is provided with a positive electrode and a negative electrode is connected to a neutral point of the source with reference to the several positive electrodes. This applies to the overlapping currents of the three phase system or a system supplying a larger number of phases than three. It is also evident that the system may be employed with a single phase or an ordinary two phase alternating current, provided means are employed for keeping the negative electrode reluctance broken down during operation, as by an independent source of direct current. In such cases a supplemental positive electrode will generally be employed.

The system may be used for supplying light or for transmitting currents to a work circuit, as desired. In the former case the positive and negative electrodes will be separated by such a space as to present a vapor path of considerable length for giving light, as set forth in my Letters Patent 955,459 granted April 19th, 1910. When, however, the device is to be employed for transmitting current of one direction to a work circuit, the length of the container may be selected at will, but in general the use of a long tubular container will be avoided, unless the purpose is to supply light in the device itself and also to transmit energy to a receiving circuit.

Figures 2, 3:
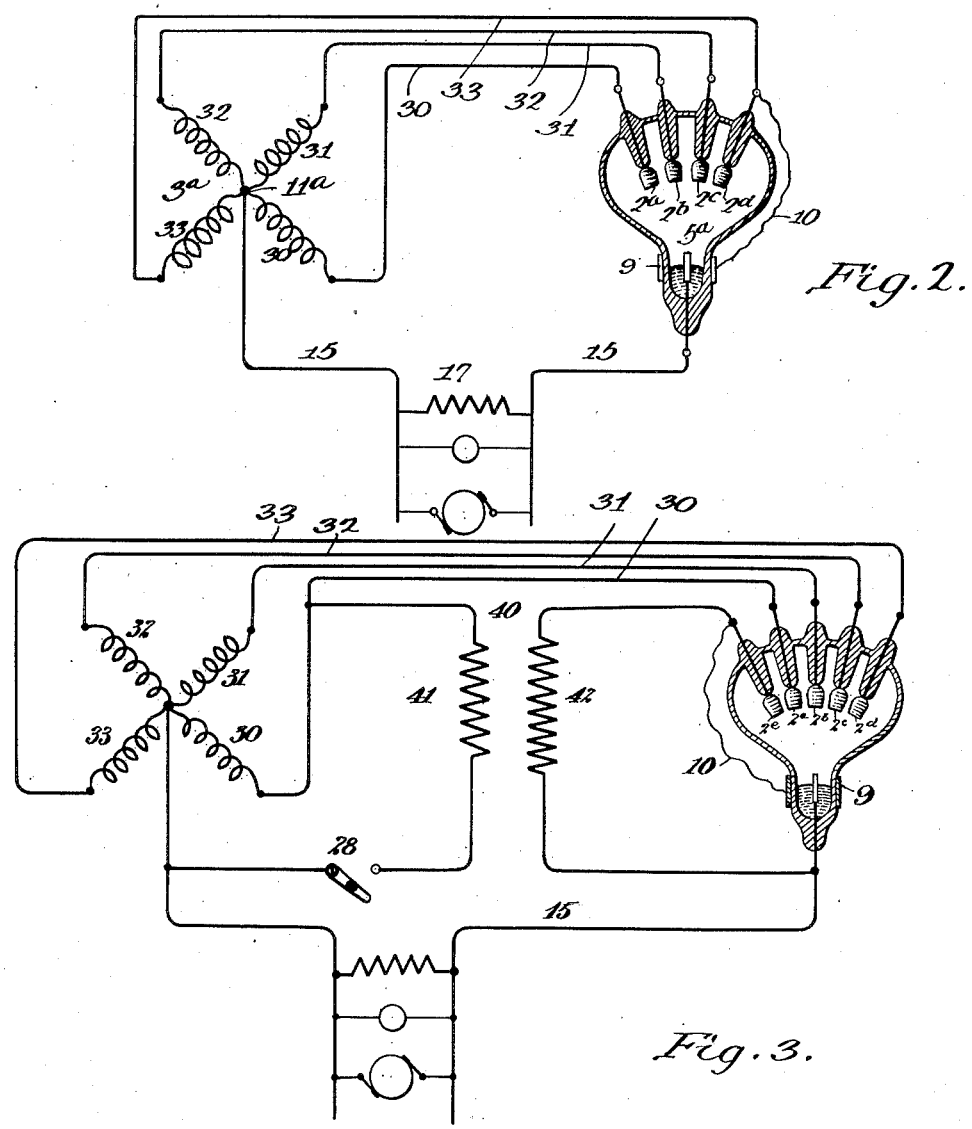
Figure 4:
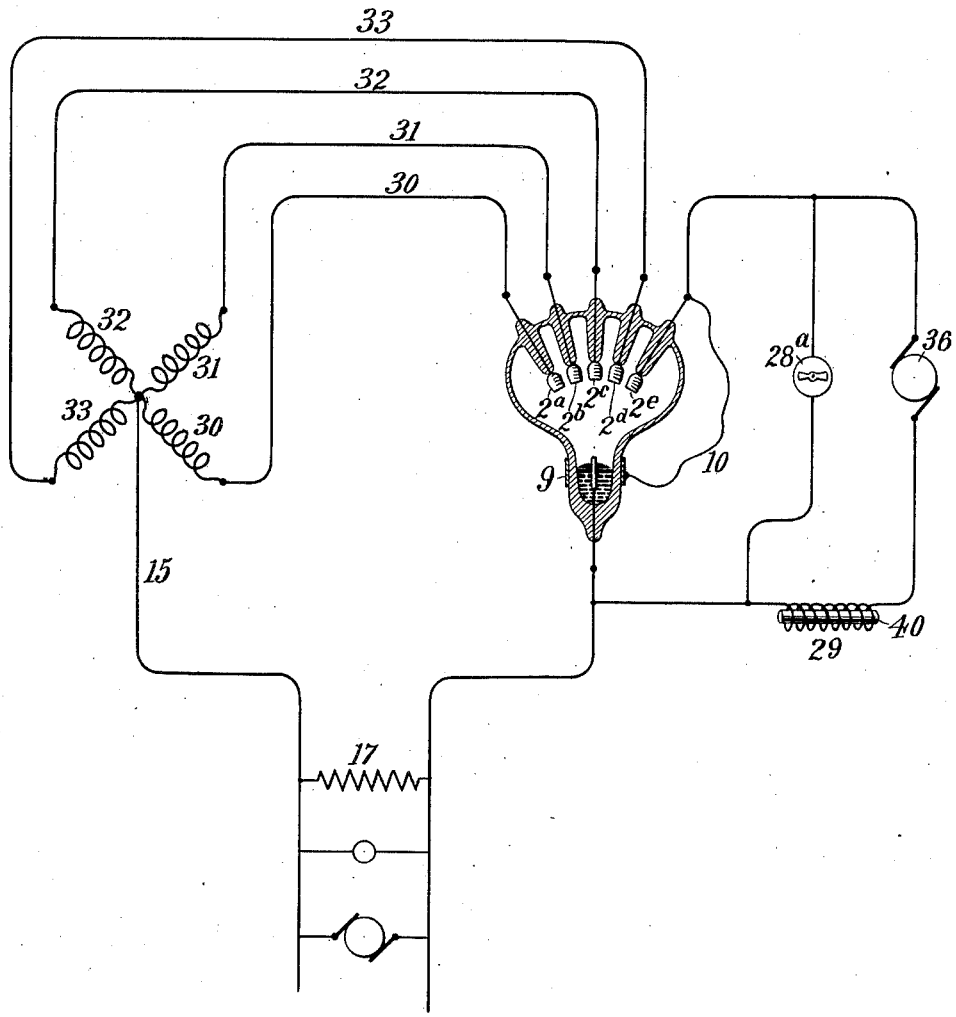

In the accompanying drawings I have illustrated in Figure 1 a device and circuits showing the general organization of the apparatus for three phase currents; Fig. 2 illustrates an arrangement in which a four-phase current is employed; Fig. 3 shows the system illustrated in Fig. 2 with the addition of starting devices therefor; and Fig. 4 is a diagram of a four phase circuit similar to Fig. 2 but having an independent direct current for producing a flow of current in the cathode.

Referring to Fig. 1 of the drawings, 1 represents an inclosing chamber which may be of glass or other suitable material, and $2^a$, $2^b$ and $2^c$, represent three positive electrodes which are suitably supported within the chamber 1, and connected with their respective leading-in conductors, $7^a$, $7^b$ and $7^c$. In the drawing these electrodes are shown as being contained within an enlargement 4. The negative electrode, 5, is shown as consisting, in this instance, of a small body of mercury with which a leading-in wire, 8, makes connection. I have illustrated at 3 a source of polyphase current, in this case, a three-phase generator, or a suitable transformer, adapted to deliver the requisite currents.

The respective terminals of the source are connected by conductors, 12, 13 and 14, with the respective positive electrodes $2^a$, $2^b$ and $2^c$. The neutral point, 11, of the source is connected by a conductor 15, through any desired circuit, 17, with the leading-in wire 8.

For the purpose of starting the device, any suitable means may be employed. I usually surround the portion of the device adjacent to the negative electrode by a conducting band, 9, connected with any one of the conductors leading to the positive electrodes; for instance with the conductor 12, or, it may be connected with the earth. This serves to aid in starting a flow of current through the device.

A convenient way of starting the device and overcoming the negative electrode reluctance where the potential employed is not in itself sufficient to insure the starting, is to impress upon the terminals an electromotive-force higher than that required for its normal operation. This may be done in any convenient way as, for instance, by means of a potential raising device included in any one of the circuits. In the drawings, I have shown the coil 21 included in the conductor 15, this coil acting as a secondary to a primary coil, 22, included in the circuit of a suitable circuit-interrupter such, for instance, as Wehnelt interrupter, 24, one terminal of the primary coil being connected with the conductor 15 and the other by the conductor 23, with one side of the Wehnelt interrupter, the other side of the Wehnelt interrupter being connected by a conductor 25, with the conductor 12 for instance. A switch 26 may be included in the conductor 25 for controlling its circuit connections, and a conductor 27 with a switch 28 may be employed for short-circuiting or cutting out of circuit, the coil 21. For special reasons the coil 21 may be put in other portions of the circuit, provided it is so arranged as to cause a momentary high electro-motive-force to be impressed upon the terminals of the device. Other means of starting the device may be employed, if desired.

When the flow of current has been started it will continue to pass in succession from the several electrodes $2^a$, $2^b$ and $2^c$, to the negative electrode 5, the successive electrodes being in effect substituted, the one for another, as the positive electro-motive-force applied to one falls, and the positive electro-motive-force to the succeeding one rises, the essential point being that there is always a sufficient flow of current through the device to maintain it in its conductive condition and to prevent the restoration of the negative electrode reluctance at the negative electrode.

The invention is useful in various cases where it is desired to derive a direct current from an alternating source. In effect such an apparatus as described herein serves the purpose of a rectifying device, whereby currents from a source of alternating electro-motive-forces pass through the apparatus and through the circuit connected therewith in one direction. The function and operation of this translating device are substantially the same whether it is itself used alone or as a medium for transmitting current to other translating devices.

When the device is to be used for the latter purpose and a lower resistance is desired, the device may be constructed more like the form shown in Fig. 2, where the negative electrode is in closer proximity to the positive electrodes, reducing the resistance due to the intervening vapor.

In Fig. 2, I have illustrated the invention as employed in connection with a four-phase electric circuit. In this instance, the conductors from the four terminals, 30, 31, 32, 33, of the source $3^b$ are connected with the four positive electrodes $2^a$, $2^b$, $2^c$ and $2^d$, while the neutral point $11^a$ is connected by a conductor 15 through a work circuit, 17, with the negative electrode, $5^a$, of the device. I have shown the chamber 1 in this figure as being comparatively short in length and of large cross-section, and so constructed that practically no energy is consumed in producing light, the purpose being to utilize the device for producing current continuous in direction for operating the apparatus included in the work circuit.

The device shown in Fig. 2 may be started by the means described and shown in connection with Fig. 1 or Fig. 4, or by means of a high potential induced current of small quantity derived through a transformer from the conductor 15 and one of the conductors 30, 31, 32, or 33. Such induced electro-motive-force may be applied to a supplemental electrode, as illustrated in Fig. 3, for instance, wherein the transformer 40 is shown as having its primary 41 capable of being connected by means of a switch 28 between the conductors 15 and 30, while the secondary, 42, has one terminal connected with an auxiliary electrode, $2^e$, and its other terminal with the conductor 15. The starting band 9 in this instance is connected by a conductor 10 with the electrode $2^e$.

Fig. 4 shows a container with four main anodes $2^a$ $2^b$ $2^c$ $2^d$ and a supplemental anode $2^e$. The main anodes are supplied from a source similar to that of Fig. 2 whose neutral point is connected through load devices 17 to the cathode of the device, also as in Fig. 2. The supplemental electrode $2^e$ is connected with the positive terminal of a source, 36, of direct current, the negative terminal of which is connected through a reactive device 29 with the negative electrode. A switch, $28^a$, included in a short-circuit is employed for starting the device, the switch 28ᵃ being a quick-break switch across the terminals of the source 36. Upon suddenly rupturing the short-circuit by operating the quick-break switch 28ᵃ, the reactive device 29 tends to discharge itself through the medium between the positive electrode 2ᵉ and the negative electrode. The coil of the reactive device may remain in circuit as a steadying resistance, if desired. The source 36 of continuous currents affords a sufficient electromotive-force to prevent the negative electrode reluctance from reëstablishing itself independently of the action of the electromotive-forces produced by the alternating generator.

The claims of this application relate to the apparatus described and shown herein, the method involved in the operation of the apparatus being claimed in a separate application executed on the same day herewith, said application having been filed on the 30th day of October, 1902, and bearing the Serial Number 129,353.

In divisional applications Serial Number 158,458, filed May 23rd, 1903, and Serial Number 731,245 filed November 14, 1912, claims are made upon certain features herein described.

I claim as my invention:—

1. An electric device consisting of a container, and within the same, a plurality of positive electrodes, a negative electrode, and an intervening gas or vapor, in combination with a source of polyphase alternating currents having corresponding terminals connected with the several positive electrodes, a connection from a neutral point of said source with the negative electrode, a supplemental positive electrode, and a source of continuous currents having its positive and negative poles connected, respectively, with the supplemental positive electrode and with the negative electrode.

2. The combination of an exhausted envelop, multiphase electrodes for said envelop, and supplemental means for continuously generating ionized vapor in said envelop.

3. The combination of an exhausted envelop, multiphase electrodes for said envelop, and means independent of the source of alternating current for starting the flow of current from the alternating current source through the envelop.

4. The combination of an exhausted envelop or receptacle, multiphase electrodes therefor, one at least of which is of vaporizable material, and a source of direct current coöperating with a vaporizable electrode for producing ionized vapor in said envelop.

5. The combination of a source of multiphase alternating current, an exhausted envelop, multiphase electrodes in said envelop and adapted to operate as anodes, an electrode adapted to operate as a common cathode, means independent of the multiphase source for generating ionized vapor in said envelop, and a return circuit extending from the cathode to a point of neutral potential on said source.

6. The combination of a source of multiphase alternating current, an exhausted envelop, multiphase electrodes in said envelop and adapted to operate as anodes, an electrode adapted to operate as a common cathode, means independent of the multiphase source for generating ionized vapor in said envelop, a return circuit extending from the cathode to a point of neutral potential on said source, and a translating device or devices in said circuit.

7. The combination of a source of multiphase alternating current, an exhausted envelop, multiphase electrodes in said envelop and adapted to operate as anodes, an electrode adapted to operate as a common cathode, a source of direct current for generating ionized vapor in said envelop, a return circuit extending from the cathode to a point of neutral potential on said source, and a translating device or devices in said circuit.

8. A rectifying device consisting of a receptacle or inclosure, main terminals for connection to a multiphase circuit, a coöperating terminal for conveying current supplied through the multiphase terminals, and means operating to maintain a continuous unidirection discharge in said receptacle as a result of which waves of current of one polarity only are supplied from said multiphase leads.

9. A rectifying device for alternating currents, consisting of an exhausted receptacle or envelop, main terminals for connection to a multiphase circuit, a single terminal coöperating therewith and operating to convey current supplied through said multiphase terminals, and a continuously operating source of ionized vapor in said receptacle or envelop for causing alternating electromotive forces impressed upon the rectifying device to set up a flow of unidirectional current.

10. The combination of an exhausted receptacle or envelop, multiphase terminals therefor, a single coöperating terminal for conveying current flowing through said multiphase terminals, and means in connection with said last mentioned terminal for locally producing ionized vapor.

11. The combination of an exhausted receptacle or envelop, multiphase terminals communicating with the interior of the receptacle or envelop, a vaporizable electrode for coöperating with said multiphase terminals, and means independent of said multiphase terminals for deriving from said vaporizable electrode a continuous discharge of ionized vapor for starting the main discharge between said multiphase terminals and said vaporizable electrode or for both starting said discharge and maintaining the same.

12. The combination of an exhausted envelop, electrodes for said envelop for receiving currents of different phase, one of said electrodes being a reconstructing cathode and supplemental means for continuously generating ionized vapor in said envelop.

13. The combination of an exhausted envelop, electrodes for said envelop for receiving currents of different phases, one of said electrodes being a reconstructing cathode and means independent of the source of alternating current for starting the flow of alternating current from the alternating current source through the envelop.

14. The combination of an exhausted receptacle or envelop, terminals therefor for receiving electric currents of different phases, a single coöperating mercury terminal for conveying current flowing through said terminals, and means in connection with the last mentioned terminal for locally producing ionized vapor.

15. The combination of an exhausted envelop, electrodes therefor, means for delivering electric currents of different phases to said electrodes, a coöperating electrode for conveying currents flowing from the first named electrodes, and means in connection with the last mentioned electrode for starting the flow of current through the first named electrodes.

Signed at New York, in the county of New York, and State of New York, this 29th day of October, A. D. 1902.

PETER COOPER HEWITT.

Witnesses:
CHARLES A. TERRY,
WM. H. CAPEL.